(12) United States Patent
Genduso

(10) Patent No.: US 6,303,032 B1
(45) Date of Patent: Oct. 16, 2001

(54) PORTABLE MULTI-STRAINER

(76) Inventor: Serafina Genduso, Melrose Vista Station, Fort Lauderdale, FL (US) 33312

( * ) Notice: Subject to any disclaimer, the term of this patent is extended or adjusted under 35 U.S.C. 154(b) by 0 days.

(21) Appl. No.: 09/638,404

(22) Filed: Aug. 15, 2000

(51) Int. Cl.$^7$ ............ E03C 1/264; B01D 29/03; B01D 29/05
(52) U.S. Cl. ............ 210/232; 210/482; 210/488; 210/489; 4/290; 4/291; 4/652
(58) Field of Search ............ 210/232, 482, 210/488, 489; 4/290, 291, 652

(56) References Cited

U.S. PATENT DOCUMENTS

| | | |
|---|---|---|
| 587,559 * | 8/1897 | Riley . |
| 852,233 * | 4/1907 | Lyke . |
| 1,411,684 * | 4/1922 | Debney . |
| 1,491,105 * | 4/1924 | Luber . |
| 1,594,400 * | 8/1926 | Wuest . |
| 1,664,521 * | 4/1928 | Mayette . |
| 1,976,549 | 10/1934 | Foose ................... 4/237 |
| 2,285,833 | 6/1942 | Platt .................... 210/170 |
| 2,367,794 * | 1/1945 | Marselus . |
| 3,509,587 | 5/1970 | Fins ..................... 4/283 |
| 3,813,708 | 6/1974 | Hamburg ............... 4/286 |
| 4,045,351 | 8/1977 | Peterson ................ 210/238 |
| 4,164,796 | 8/1979 | Sakow ................... 4/288 |
| 4,232,407 | 11/1980 | Williams ................ 4/287 |
| 4,692,948 | 9/1987 | Martin .................. 4/286 |
| 5,165,118 | 11/1992 | Cendrowski ............. 4/287 |
| 5,369,815 | 12/1994 | Martin .................. 4/287 |
| 5,418,983 | 5/1995 | Garguillo ............... 4/287 |
| 5,733,445 * | 3/1998 | Fanelli . |

FOREIGN PATENT DOCUMENTS

| | | |
|---|---|---|
| 19731800 * | 9/1998 | (DE) . |
| 397422 * | 8/1933 | (GB) . |
| 401861 * | 11/1933 | (GB) . |
| 734203 * | 7/1955 | (GB) . |
| 777262 * | 6/1957 | (GB) . |
| 2288340 * | 10/1995 | (GB) . |

* cited by examiner

Primary Examiner—Thomas M. Lithgow

(57) ABSTRACT

'A Portable Multi-Strainer (11)' for a kitchen sink comprising a filter screen (14) having a top and bottom surface, a top grid (12) having openings therein abutting the top surface of the filter screen (14), a bottom grid (15) having openings therein abutting the bottom surface of the filter screen (14), said strainer (11) being sized to cover the entire bottom of said kitchen sink and having a thin edge (18) border (17) adapted for a tight fit to the walls of said sink. The top grid (12) openings therein comprise numerous cells (13) all having top and bottom openings. Cells' (13) bottom openings abutting the top surface of the filter screen (14), 'coinciding' with the bottom grid's (15) openings abutting the bottom surface of the filter screen (14), resulting with all cells (13) functioning as many individual strainers, having waste particles retaining inside the cells (13) as water drains through filter screen (14) and the bottom grid's (15) openings. Present invention (11) has feet (16) extending from the underside of the bottom grid (15) without blocking bottom grid's (15) openings; the feet (16) provides air-space between the filter screen (14) and the sink bottom. The top grid (12) with the cells' (13) top openings, keep present invention's (11) top surface clean upon which to place objects.

7 Claims, 3 Drawing Sheets

PORTABLE MULTI-STRAINER

BACKGROUND

1. Field of Invention

Figure 1:
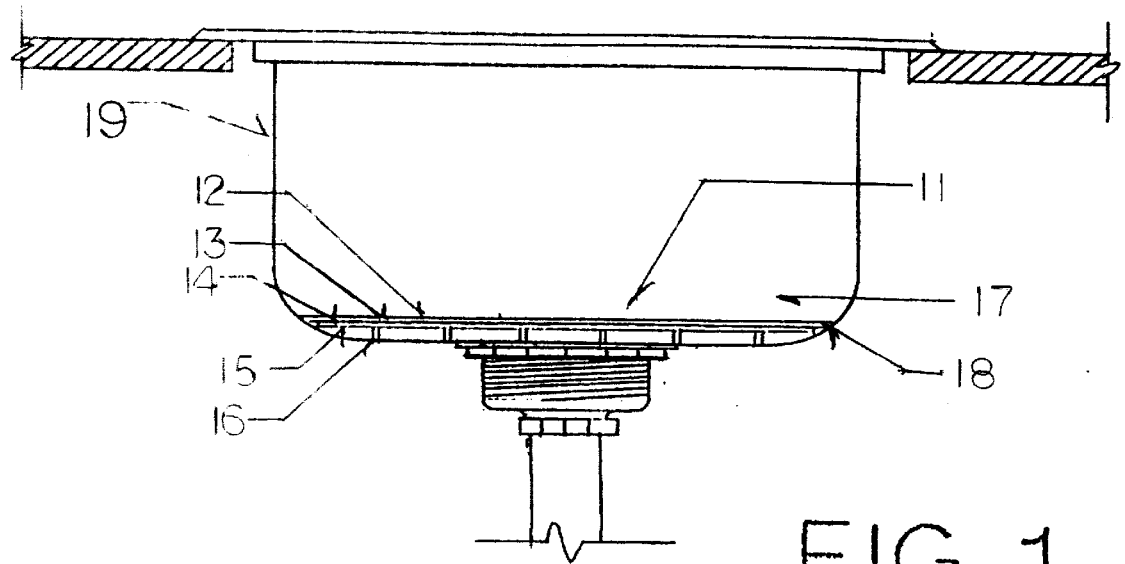

This invention relates to sink-drain strainers, specifically to such strainers which help keep chemical-waste out of our nation's waterways.

2. Description of Prior Arts

Today many sink-drain outlets contain a removable perforated cup to prevent waste particles from entering and clogging the drainpipe. But the perforated cup alone is not adequate, it continuously gets clogged with waste particles causing blockage of the drain. This necessitates the repeated removal of the perforated cup, causing sink-water and waste-particles together to flow down the drain, resulting in waste particles continuously clogging the drainpipes.

There are several brands of chemicals on the market which are used to unclog, or to keep from clogging, sink drainpipes. Consumers pour these chemicals into their sink-drainpipes. Nationwide, the use of these chemicals produces many gallons of chemical-waste, most of which are ending up in our streams and rivers and polluting our waterways.

Inventors have created several types of sink-drain devices to prevent waste-particles from clogging the sink-drainpipes. For example:

U.S. Pat. No. 1,976,549 to Foose (1934) 'Drain Fixture For Sinks': shows a stopper and strainer, designed to be connected to a drainpipe.

U.S. Pat. No. 2,285,833 to Platt (1942) 'Disposable Drain Strainer': shows a disposable waste strainer cup of flexible material fitted in the sink drain-outlet.

U.S. Pat. No. 3,509,587 to Fins (1970) 'Sink Strainer Body Assembly': relates to a sink strainer of the type mounted in the discharge outlet of a sink.

U.S. Pat. No. 3,813,708 to Hamburg (1974) 'Kitchen Sink and Drain Bowl Unit': shows a drain bowl fastened within the drain opening of a kitchen sink.

U.S. Pat. No. 4,045,351 to Peterson (1977) 'Sink Strainer Device': shows an elongated cylinder is mounted beneath the sink in communication with the opening. The cylinder contains a holder with a disposable strainer therein and is removable for exchange through an opening in an end of the cylinder. Once every week or two the disposable strainer with dirt and sewage collected therein is removed and disposed in the garbage, then a new disposable strainer is installed in the holder in the cylinder.

U.S. Pat. No. 4,164,796 to Sakow (1979) 'Sink Strainer Assembly': Connect the strainer assembly to the plumbing system.

U.S. Pat. No. 4,232,407 to Williams (1980) 'Basket Strainer And Stopper Assembly For Sinks': shows a basket strainer located in sink drain-outlet.

U.S. Pat. No. 4,692,948 to Martin (1987) 'Sink Strainer Having A Magnet': a basket strainer is operatively mounted in the strainer body, located in sink drain-outlet.

U.S. Pat. No. 5,165,118 to Ceadrowski (1992) 'Sink Strainer Assembly With Snap Lock': having a lower portion connected to a drain.

U.S. Pat. No. 5,369,815 to Martin (1994) 'Sink Strainer Having A Detachable Seal': a basket strainer is operatively mounted in the strainer body, located in the sink drain outlet.

U.S. Pat. No. 5,418,983 to Garguillo (1995) 'Decorative Color Changeable Basket Sink Strainer': shows strainer body installed between the sink and the waste pipe.

NEVERTHELESS, the above prior-art inventions have a number of disadvantages:

The invention having a disposable strainer inside a cylinder: U.S. Pat. No. 4,045,351:

a) Manufacture of the cylinder and its installation to the drainpipe beneath the sink can be very expensive.

b) Cutting into a drainpipe to install the above cylinder increases the risk of developing water leakage.

c) Collecting dirt and sewage in a cylinder for a week or two can develop a bad odor and bacteria.

d) Forgetting to remove the dirt-filled disposable strainer from the cylinder results in repeatedly clogged sink drain-outlets.

e) Many of the above prior-art inventions have one thing in common: They have placed their inventions 'inside' the sink's drain-outlet, which demands the disposal of the waste-particles 'after' the waste particles entered the sink's drain-outlet.

However, 'Logic' reveals the simplest method of preventing sink drainpipes from clogging is to trap and dispose of sink waste-particles 'before' they reach the drain-outlet. I base my present invention 'A Portable Multi-Strainer' on this simple logic as described in this patent application.

My 'Portable Multi-Strainer' provides a device which traps waste-particles before they reach the sink-drain outlet, resulting in sink drainpipes kept free from clogging. This is accomplished without cutting into the drainpipes and without the use of chemicals.

OBJECTS AND ADVANTAGES

The objects and advantages of my Portable Multi-Strainers as described in this patent application are:

a) to provide a portable sink-drain strainer having numerous strainers per-sink.

b) to provide a sink-drain strainer that is portable, and its numerous strainers cover the entire sink bottom, including the sink drain-outlet: From which derives it title, 'A Portable Multi-Strainer'.

c) to provide a sink-drain strainer having numerous strainers all working in unison trapping and keeping waste particles from entering the sink drain-outlet and clogging the drainpipe.

d) to provide a sink-drain strainer which is durable, simple in construction and inexpensive to manufacture. It has no moving parts, needs no electric power, is portable, and needs no tools to install or remove.

Still further objects and advantages will become apparent from the consideration of the ensuing description and drawings.

DRAWING FIGURES

FIG. 1: SECTION: present invention located in sink-bottom.

Figure 2:
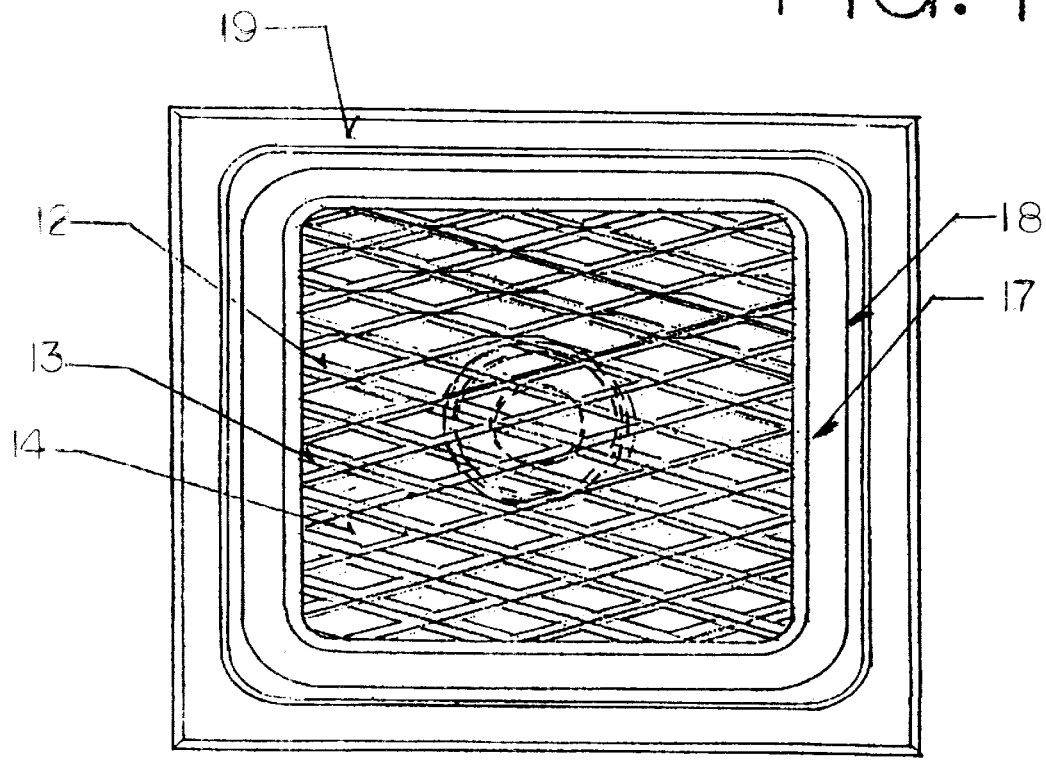

FIG. 2: PLAN VIEW: present invention positioned in bottom of sink

Figure 3:
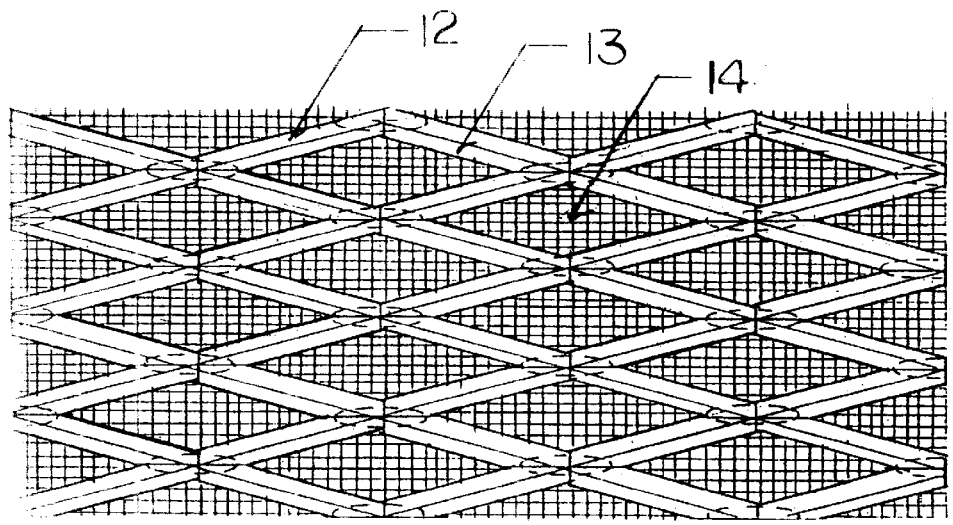

FIG. 3: ENLARGED PLAN VIEW #1: top grid with the filter Screen (FIG. 3 is an enlarged portion of FIG. 2)

Figure 4:
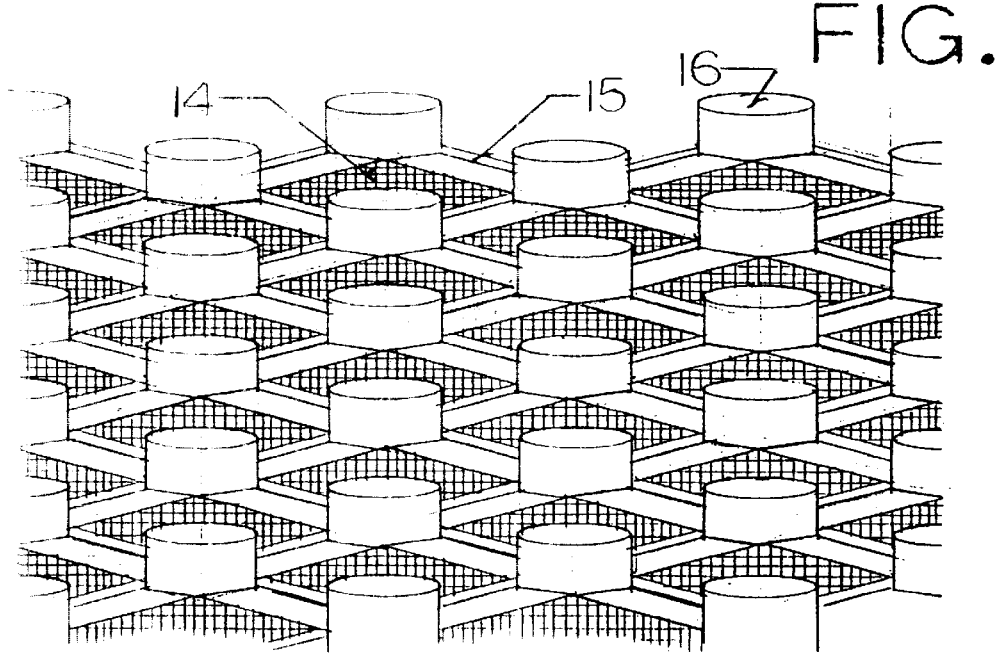

FIG. 4: ENLARGED ISOMETRIC: underside of the bottom grid and its 'raised feet' to allow water drainage. (FIG. 4 is a portion of the underside of FIG. 1)

Figure 5:
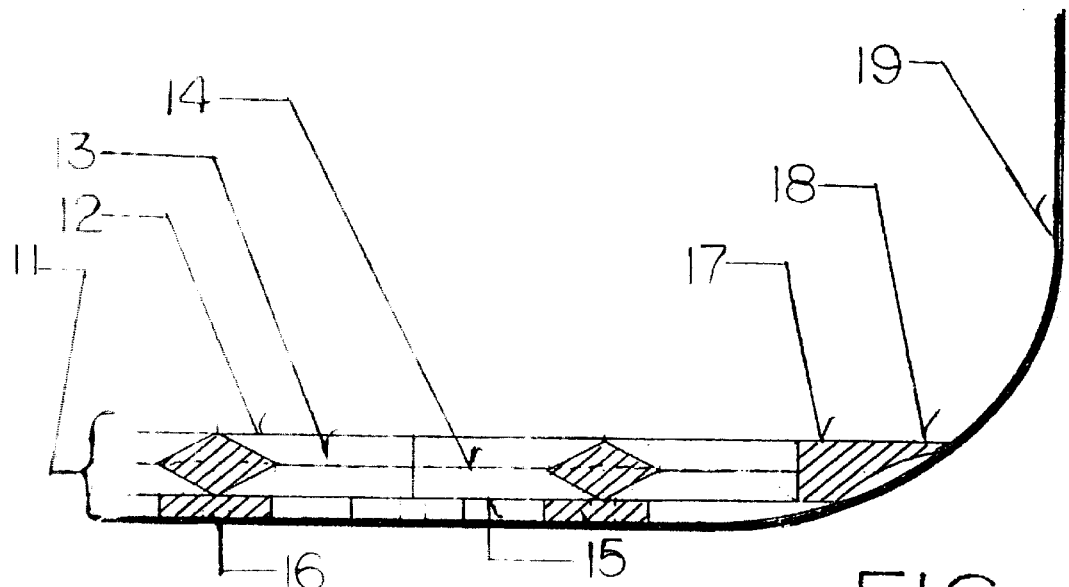

FIG. 5: ENLARGED SECTION: a corner of present invention, with its thinned edge border for tight fit in sink.

Figure 6:
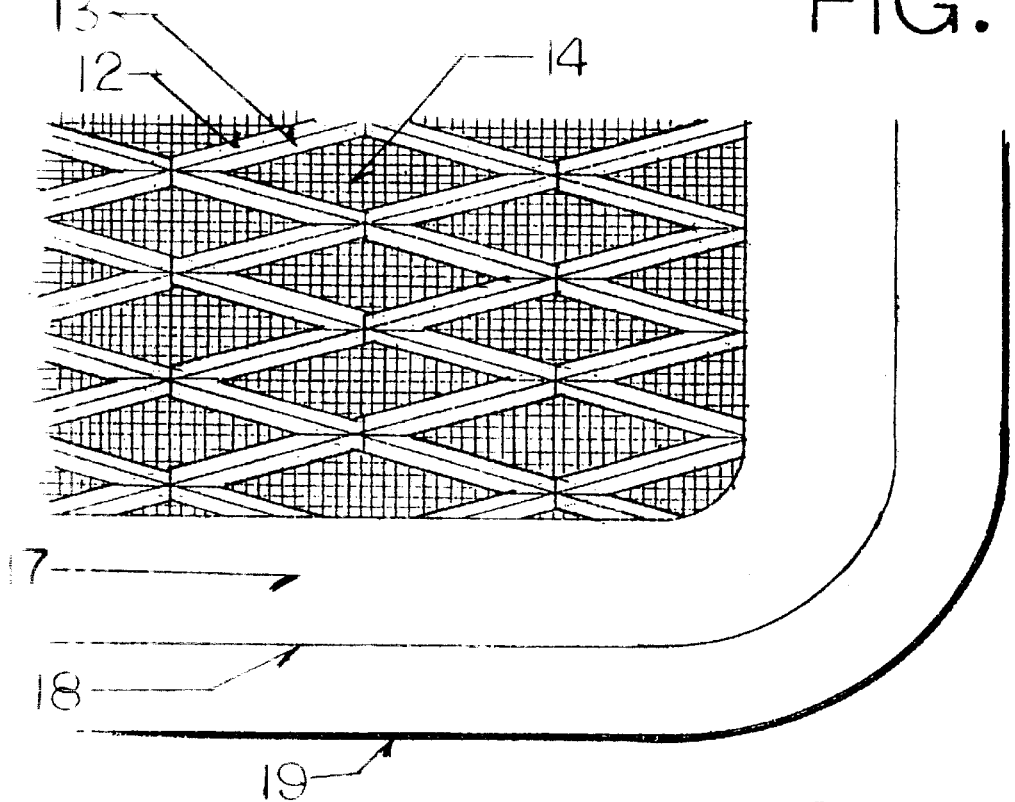

FIG. 6: ENLARGED PLAN VIEW #2: a corner of present invention positioned at corner of sink (19).

REFERENCE NUMBERS IN DRAWINGS

11. Portable Multi-Strainer (present invention)
12. Top grid

13. Top grid's depth
14. Filter-screen
15. Bottom grid
16. Raised feet on underside of the bottom grid
17. Border
18. Border's thinned edge for tight fit in sink
19. (Sink)

SUMMARY

The Portable Multi-Strainer (present invention) comprises a filter-screen placed between the top grid and the bottom grid, from which derives numerous strainers per-sink.

DESCRIPTION: FIGS. 1 to 6

The typical embodiment of the present invention (11) is illustrated in FIG. 1 (side view), and FIG. 2 (top view). Present invention (11) covers the entire sink-bottom (19), including the sink-drain outlet (FIG. 2), thus keeping the sink and the drain clean simultaneously.

Present invention (11) comprises the filter-screen (14) placed between the top grid (12) and the bottom grid (15) FIGS.1, and 5. The numerous openings in the top grid (12) and the bottom grid (15) with the filter-screen (14) positioned in-between (12, 14, 15) form into numerous strainers FIG. 2, trapping and preventing waste particles from entering the drain-outlet and clogging the drainpipe: FIGS. 1, and 5.

From the surface of the top grid (12) FIG. 2 down to the filter-screen (14) derives the depth (13) of the numerous strainers FIG. 3 in which the sink's waste-particles are trapped.

On the underside of the bottom grid (15) are 'raised feet' (16) FIG. 4 forming 'air spaces' beneath the numerous strainers FIG. 1 thereby the water flows freely through the strainers, the air-spaces, on to the sink-bottom (19) and down the drain clear of all waste-particles FIG. 1. Plus, the 'raised feet' (16) FIG. 4 will help support the weight of the objects placed on the numerous strainers (11) FIG. 1.

Present invention's (11) border (17) has a thinned edge (18) for a tight fit in the sink (19) FIG. 2, which prevents waste-particles from passing under the border's (17) edge (18) and clogging the drainpipe FIGS. 1, 2, and 5. Present invention (11) being portable is easily and quickly taken out of the sink-bottom (19) cleaned of waste-particles, and returned back on its (11) feet (16) in sink-bottom (19) ready to use again. FIGS. 1, and 2.

The top grid (12) FIG. 2 with its depth (13) FIG. 3, and the bottom grid (15) with its raised feet (16) FIG. 4, and border (17) with its thinned edge (18) FIGS. 1, and 5, are made of PVC (polyvinyl chloride) or made of any durable material available. The filter-screen (14) is of stainless steel or fiberglass or any durable material available. The Portable Multi-Strainer's measurements are according to the various sinks' workloads, and sizes, used in the various homes and businesses.

From the description above a number of advantages of the Portable Multi-Strainer become evident:

a) it provides a sink-drain strainer which does not require chemicals to keep sink drainpipes from clogging. This saves consumers thousands of dollars in the cost of the Chemicals, and plumbing repairs to unclog sink drainpipes b) it provides a sink-drain strainer which does not require cutting into the sink-drain outlets, or drainpipes, to install. This saves consumers thousands of dollars in the cost of installation, and plumbing repairs should water-leakage occur due to the installations.

c) it provides a 'ready to use' product, requiring no assembling of parts by the consumer and no complicated instructions to operate.

OPERATION FIGS. 1 to 6

Present invention (11) is a ready to use product having Eno moving parts and needs no electric power. FIGS. 1, and 2. To operate it (11) requires only, to place it (11) on its feet (16) FIG. 4 in sink-bottom FIGS. 1, and 2.

To clean present invention (11) requires only to take it (11) out of the sink (19) hold it (11) 'face down' and shake the waste-particles out of the numerous strainers on to an old newspaper. Throw out newspaper with waste-particles. Then wash present invention (11) and return it (11) back on its feet (16) to sink-bottom (19) and it (11) is ready to use again, FIGS. 1, and 2.

Thus, present invention (11) is simple to use and quick and easy to clean.

SUMMARY, RAMIFICATIONS, AND SCOPE

The reader will see that this invention can be used easily, conveniently, and without damage or disturbance to sink-drain outlet, drainpipe, or the sink-bottom.

In addition, the Portable Multi-Strainer can be made in many shapes, such as square, circular, rectangular, etc. according the needs of the Market Place. Also, the depth of the strainers can be as deep as needed for the various homes and businesses, accordingly.

Furthermore, the Portable Multi-Strainer (present invention) has additional advantages in that:

a) it is user friendly, simple to use, quick and easy to clean, has no moving parts, need not electric power to operate, and being portable needs no tools to install or remove.

b) it is simple in construction and Inexpensive to manufacture, thus it is economical, cost-efficient, and attractive to investors, individual consumers, and specific companies.

Nationwide, more utilization of present invention will occur, resulting with an increasing number of sink-drainpipes kept free from clogging without the use of chemicals. The use of these chemicals produce many gallons of chemical-waste most of which are ending up in our streams and rivers and polluting our waterways.

Nationwide, the invention in this patent application will help reduce the need to use these chemicals, resulting in less chemical-waste ending up in our streams and rivers and polluting our waterways. Thus our water quality will be maintained and will gradually be restored due to national self-purification.

CHAIN REACTION

1. Present invention will reduce the need for drainpipe cleaning chemicals.

2. Less chemicals will reduce the chemical-waste ending up in our streams and rivers and polluting our waterways.

3. Less chemical-waste will reduce the taxes needed to clean the polluted waterways.

4. Less taxes will reduce the struggles our people have.

Although the description above contains many specifics, these should not be construed as limiting the scope of the invention but as merely providing illustrations of some of the present advantages of this invention.

The scope of this invention should be determined by the appended claims and their legal equivalents, rather than by the examples given.

I claim:

1. A portable multi-strainer for a kitchen sink comprising a filter screen having a top and bottom surface, a top grid having openings therein abutting the top surface of said filter screen, a bottom grid having opening therein abutting the bottom surface of the filter screen, said strainer being sized to cover the entire bottom of said kitchen sink and having a thin edge border adapted for a tight fit to the walls of said sink.

2. A portable multi-strainer as claimed in claim 1, having the top grid opening therein comprising numerous cells in vertical position, and all said cells having both top and bottom openings.

3. A portable multi-strainer as claimed in claim 2, having the top grid's cells' bottom openings abutting the top surface of said filter screen, to collect waste particles inside said cells.

4. A portable multi-strainer as claimed in claim 1, has bottom grid having openings therein abutting the bottom surface of the filter screen to help support said filter screen.

5. A portable multi-strainer as claimed in claims 3 or 4, having top grid's cells' bottom openings abutting the top surface of said filter screen coincide with the bottom grid's openings abutting the bottom surface of said filter screen, resulting with all said cells functioning as individual strainers.

6. A portable multi-strainer as claimed in claim 4 having feet extending from the underside of the bottom grid, without blocking bottom grid's said openings, said feet elevates and stabilizes said filter screen, and provides airspace between the filter screen and the sink bottom.

7. A portable multi-strainer as claimed in claim 3 collecting waste particles inside said cells in the top grid.

\* \* \* \* \*